(12) United States Patent
Ohashi et al.

(10) Patent No.: US 8,687,939 B2
(45) Date of Patent: Apr. 1, 2014

(54) RECORDING/REPRODUCING SYSTEM, RECORDING/REPRODUCING APPARATUS, AND METHOD FOR CONTROLLING RECORDING/REPRODUCING APPARATUS

(75) Inventors: Hisashi Ohashi, Tokyo (JP); Masaya Nakatani, Tokyo (JP)

(73) Assignee: Sony Corporation, Tokyo (JP)

( * ) Notice: Subject to any disclaimer, the term of this patent is extended or adjusted under 35 U.S.C. 154(b) by 1202 days.

(21) Appl. No.: 12/439,201

(22) PCT Filed: Jul. 12, 2007

(86) PCT No.: PCT/JP2007/064299
§ 371 (c)(1),
(2), (4) Date: Feb. 27, 2009

(87) PCT Pub. No.: WO2008/029556
PCT Pub. Date: Mar. 13, 2008

(65) Prior Publication Data
US 2009/0269039 A1 Oct. 29, 2009

(30) Foreign Application Priority Data

Aug. 29, 2006 (JP) .................................. 2006-232072

(51) Int. Cl.
*H04N 5/775* (2006.01)
(52) U.S. Cl.
USPC ........................................ 386/230; 386/224
(58) Field of Classification Search
USPC ........................................ 386/117, 230, 224
See application file for complete search history.

(56) References Cited

U.S. PATENT DOCUMENTS

| 5,189,520 | A | 2/1993 | Okayasu et al. |
| 6,429,896 | B1 * | 8/2002 | Aruga et al. ............. 348/231.99 |
| 8,254,991 | B1 * | 8/2012 | Biere et al. .................... 455/557 |
| 2003/0011683 | A1 * | 1/2003 | Yamasaki et al. ........... 348/207.1 |
| 2005/0041132 | A1 * | 2/2005 | Juen et al. ................. 348/333.12 |
| 2006/0066758 | A1 * | 3/2006 | Higashihara .................. 348/734 |
| 2008/0168504 | A1 * | 7/2008 | Yamada et al. ................. 725/58 |

FOREIGN PATENT DOCUMENTS

| EP | 0 444 849 | 9/1991 |
| JP | 3 247174 | 11/1991 |
| JP | 3 247175 | 11/1991 |
| JP | 2893709 | 3/1999 |
| JP | 3096160 | 6/2003 |

OTHER PUBLICATIONS

"MS Remote Desktop to access Windows XP over firewire" (Feb. 18, 2006) by Apple Support Communities et al.; 2 pages; converted to PDF originally from https://discussions.apple.com/thread/370077.*

* cited by examiner

*Primary Examiner* — Hadi Armouche
*Assistant Examiner* — Dao Ho
(74) *Attorney, Agent, or Firm* — Frommer Lawrence & Haug LLP; William S. Frommer

(57) ABSTRACT

According to the present invention, even in the case where an external recording apparatus is designed to be small and capable of being connected to various types of video equipment and is equipped with various types of operation units, an alarm display section, and so on, if the external recording apparatus is connected to a main apparatus, a menu for the external recording apparatus is provided to the main apparatus to accept a setting for the external recording apparatus with the main apparatus.

8 Claims, 11 Drawing Sheets

FIG.7
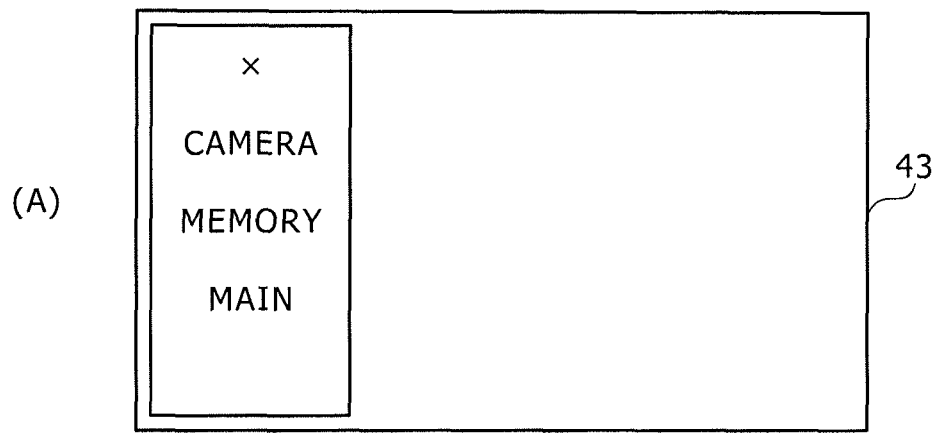
(A)
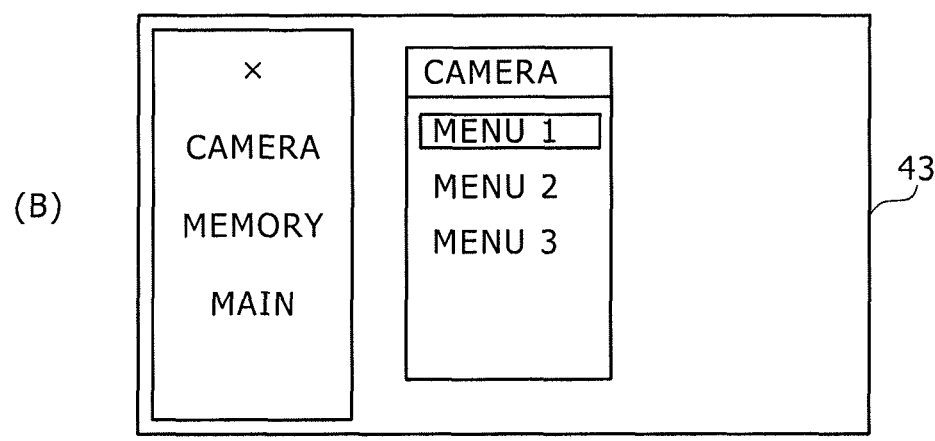
(B)
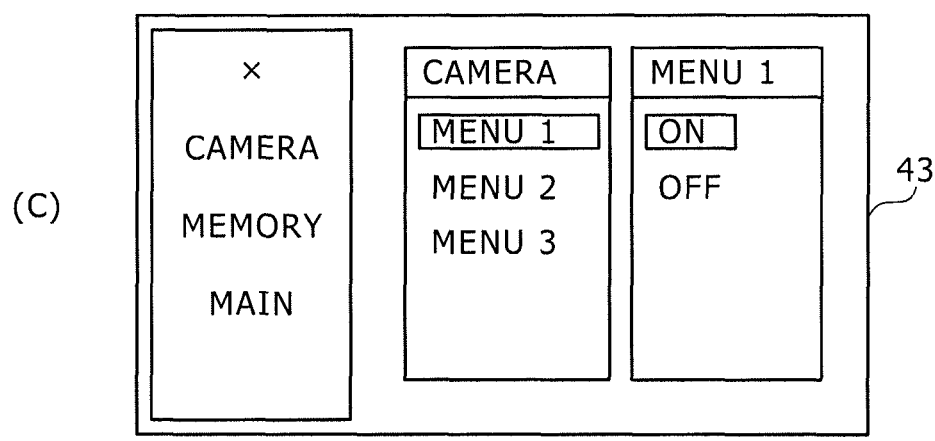
(C)

FIG. 9
(A) 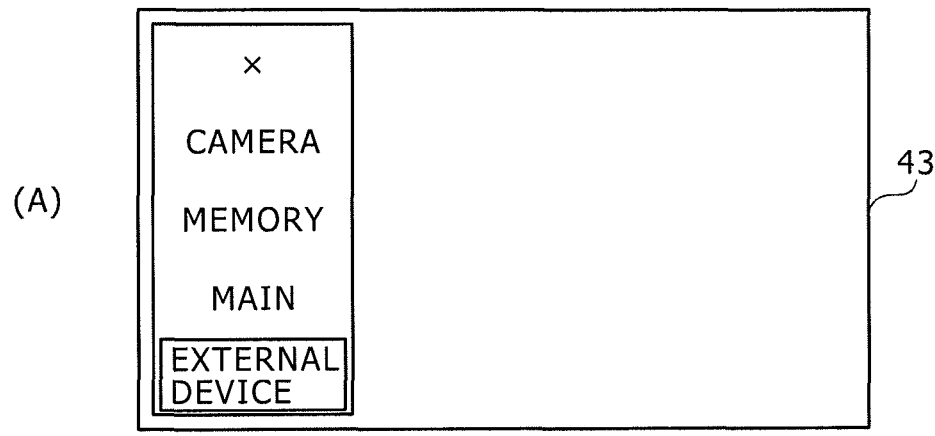
(B) 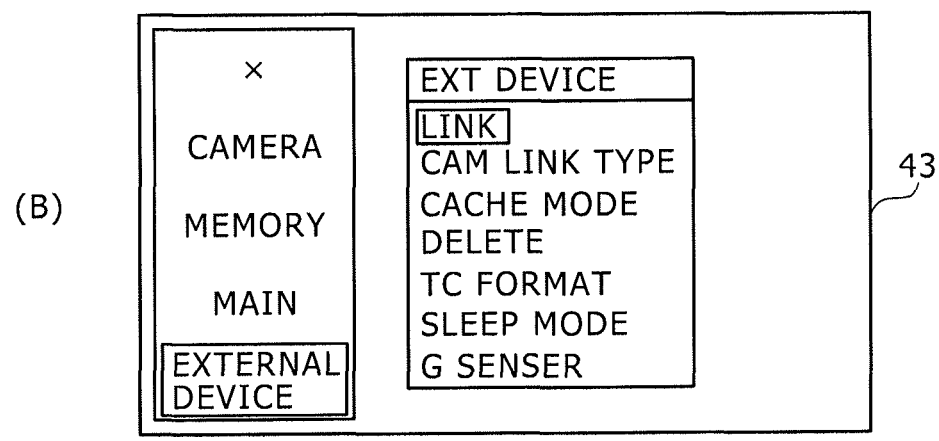
(C) 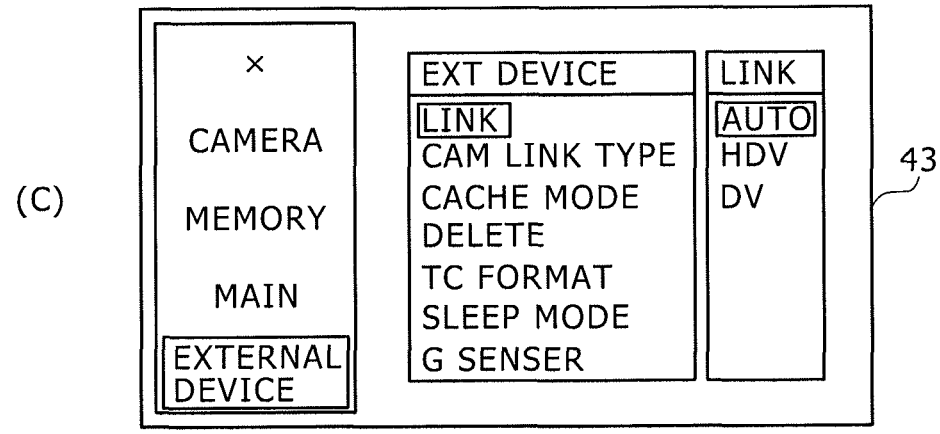

RECORDING/REPRODUCING SYSTEM, RECORDING/REPRODUCING APPARATUS, AND METHOD FOR CONTROLLING RECORDING/REPRODUCING APPARATUS

BACKGROUND OF THE INVENTION

1. Technical Field

The present invention relates to a recording/reproducing system, a recording/reproducing apparatus, and a method for controlling the recording/reproducing apparatus. The present invention can be applied to a system including a camera-integrated video tape recorder and an external recording apparatus connected to the camera-integrated video tape recorder, for example. According to the present invention, when an external recording apparatus is connected to a main apparatus, a menu for the external recording apparatus is provided to the main apparatus, and a setting for the external recording apparatus is accepted with the main apparatus. Thus, even if the external recording apparatus is designed to be small and capable of being connected to various types of video equipment, and is equipped with various types of operation units, an alarm display section, and so on, a reduction in usability of the external recording apparatus when connected to the main unit can be avoided effectively.

2. Background Art

Known camera-integrated video tape recorders record an imaging result obtained by imaging means on a recording medium, such as a magnetic tape, an optical disc, a hard disk drive, or a memory card.

In connection with such a camera-integrated video tape recorder, Japanese Patent Laid-open No. Hei 2-280575 has proposed a structure in which a video tape recorder can be externally connected thereto, and, even when an internal recording/reproducing section suffers a failure or the like, the imaging result can be recorded by the externally connected video tape recorder.

When the external recording apparatus, such as the hard disk drive, is connected to the camera-integrated video tape recorder such that the external recording apparatus is capable of recording and reproducing the imaging result, the imaging result can be recorded significantly longer than in the past. In addition, if the external recording apparatus is designed to be small and light, mobility of the camera-integrated video tape recorder is not impaired. Accordingly, it can be expected that a significant improvement will be achieved in the usability of the camera-integrated video tape recorder.

Moreover, if such an external recording apparatus is equipped with various types of operation units, an alarm display section, and so on, and is so constructed as to be capable of being operated on its own, this external recording apparatus can be connected to various types of video equipment to record video content, and will provide convenience.

However, the external recording apparatus that is designed to be small and capable of being connected to various types of video equipment and which is equipped with the various types of operation units, the alarm display section, and so on inevitably has only limited space for provision of the various types of operation units, the alarm display section, and so on. Therefore, this external recording apparatus will suffer a reduction in usability when connected to a main unit, such as the camera-integrated video tape recorder.

DISCLOSURE OF INVENTION

The present invention has been devised in view of the above considerations, and provides a recording/reproducing system, a recording/reproducing apparatus, and a method for controlling the recording/reproducing apparatus which enable effectively to avoid a reduction in usability of an external recording apparatus connected to a main unit, even in the case where the external recording apparatus is devised to be small and capable of being connected to various types of video equipment and is equipped with various types of operation units, an alarm display section, and so on.

In order to solve the aforementioned problems, the present invention is applied to a recording/reproducing system that includes a main apparatus that processes video data and audio data, and an external recording apparatus that is connected to the main apparatus and records and reproduces the video data and the audio data, wherein if the external recording apparatus is connected to the main apparatus, a menu displayed on a menu screen of the external recording apparatus is provided to the main apparatus, the provided menu is displayed on a menu screen of the main apparatus, and a selection of the provided menu is accepted with a menu-use operation unit in the main apparatus.

According to a structure of the present invention, it is possible to set the external recording apparatus in various manners by operating the main apparatus. Therefore, even in the case where the external recording apparatus is designed to be small and is equipped with various operation units, an alarm display section, and so on, it is possible to effectively avoid a reduction in usability when it is connected to the main apparatus.

The present invention is also applied to a recording/reproducing apparatus that is connected to a main apparatus that processes video data and audio data, and which records and reproduces the video data and the audio data, wherein if the recording/reproducing apparatus is connected to the main apparatus, a menu displayed on the menu screen is provided to the main apparatus, and a setting for the recording/reproducing section is accepted with the main apparatus.

According to a structure of the present invention, it is possible to set the recording/reproducing apparatus in various manners by operating the main apparatus. Therefore, even in the case where the recording/reproducing apparatus is designed to be small and is equipped with various operation units, an alarm display section, and so on, it is possible to effectively avoid a reduction in usability when it is connected to the main apparatus.

The present invention is also applied to a recording/reproducing apparatus that is capable of being connected to an external recording apparatus that records and reproduces video data and audio data, and which records and reproduces the video data and the audio data, wherein: in the case where the external recording apparatus is not connected to the recording/reproducing apparatus, a menu screen is displayed on the display section in accordance with an operation on the menu-use operation unit, and a setting for the recording/reproducing section is accepted in accordance with a menu on the menu screen selected by operating the menu-use operation unit; the recording/reproducing section is controlled with the accepted setting to record or reproduce the video data and the audio data, in accordance with an operation on the recording/reproducing-use operation unit; and when the external recording apparatus is connected to the recording/reproducing apparatus, a menu for setting an operation of the external recording apparatus is acquired from the external recording apparatus and displayed, a selection of the menu is accepted in accordance with the operation on the menu-use operation unit, and the external recording apparatus is notified of the selected menu to set the operation of the external recording apparatus.

According to a structure of the present invention, it is possible to set the external recording apparatus in various manners by operating the recording/reproducing apparatus. Therefore, even in the case where the external recording apparatus is designed to be small and is equipped with various operation units, an alarm display section, and so on, it is possible to effectively avoid a reduction in usability when it is connected to the recording/reproducing apparatus.

The present invention is also applied to a method for controlling a recording/reproducing apparatus that is connected to a main apparatus that processes video data and audio data, and which records and reproduces the video data and the audio data, the method including: a menu screen-using setting accepting step of displaying the menu screen on the display section in accordance with an operation on the menu-use operation unit, and accepting a setting for the recording/reproducing section in accordance with the menu on the menu screen selected by operating the menu-use operation unit; a recording/reproducing step of controlling the recording/reproducing section with the accepted setting to record or reproduce the video data and the audio data, in accordance with an operation on the recording/reproducing-use operation unit; and a main apparatus-using setting accepting step of, when the recording/reproducing apparatus is connected to the main apparatus, providing the menu displayed on the menu screen to the main apparatus, and accepting a setting for the recording/reproducing section with the main apparatus.

According to a structure of the present invention, it is possible to set the recording/reproducing apparatus in various manners by operating the main apparatus. Therefore, even in the case where the recording/reproducing apparatus is designed to be small and is equipped with various operation units, an alarm display section, and so on, it is possible to effectively avoid a reduction in usability when it is connected to the main apparatus.

The present invention is also applied to a method for controlling a recording/reproducing apparatus that is capable of being connected to an external recording apparatus that records and reproduces video data and audio data, and which records and reproduces the video data and the audio data, the method including: a menu screen-using setting accepting step of, in the case where the external recording apparatus is not connected to the recording/reproducing apparatus, displaying the menu screen on the display section in accordance with an operation on the menu-use operation unit, and accepting a setting for the recording/reproducing section in accordance with the menu on the menu screen selected by operating the menu-use operation unit; a recording/reproducing step of controlling the recording/reproducing section with the accepted setting to record or reproduce the video data and the audio data, in accordance with an operation on the recording/reproducing-use operation unit; and an external recording apparatus setting step of, when the external recording apparatus is connected to the recording/reproducing apparatus, acquiring a menu for setting an operation of the external recording apparatus from the external recording apparatus and displaying the menu, accepting a selection of the menu in accordance with the operation on the menu-use operation unit, and notifying the external recording apparatus of the selected menu to set the operation of the external recording apparatus.

According to a structure of the present invention, it is possible to set the external recording apparatus in various manners by operating the recording/reproducing apparatus. Therefore, even in the case where the external recording apparatus is designed to be small and is equipped with various operation units, an alarm display section, and so on, it is possible to effectively avoid a reduction in usability when it is connected to the recording/reproducing apparatus.

According to the present invention, even in the case where the external recording apparatus is designed to be small and capable of being connected to various types of video equipment, and is equipped with various operation units, an alarm display section, and so on, it is possible to effectively avoid a reduction in usability when it is connected to a main unit.

BRIEF DESCRIPTION OF DRAWINGS

FIG. 7(A), FIG. 7(B), and FIG. 7(C) are plan views of a menu screen in the camera-integrated video tape recorder of FIG. 5.

FIG. 9(A), FIG. 9(B), and FIG. 9(C) are plan views of the menu screen in the case where connection of the external recording apparatus in the recording/reproducing system of FIG. 1 has been achieved.

BEST MODE FOR CARRYING OUT THE INVENTION

Hereinafter, embodiments of the present invention will be described in detail, with reference to the accompanying drawings as necessary.

(1) STRUCTURE OF FIRST EMBODIMENT

Figure 1:
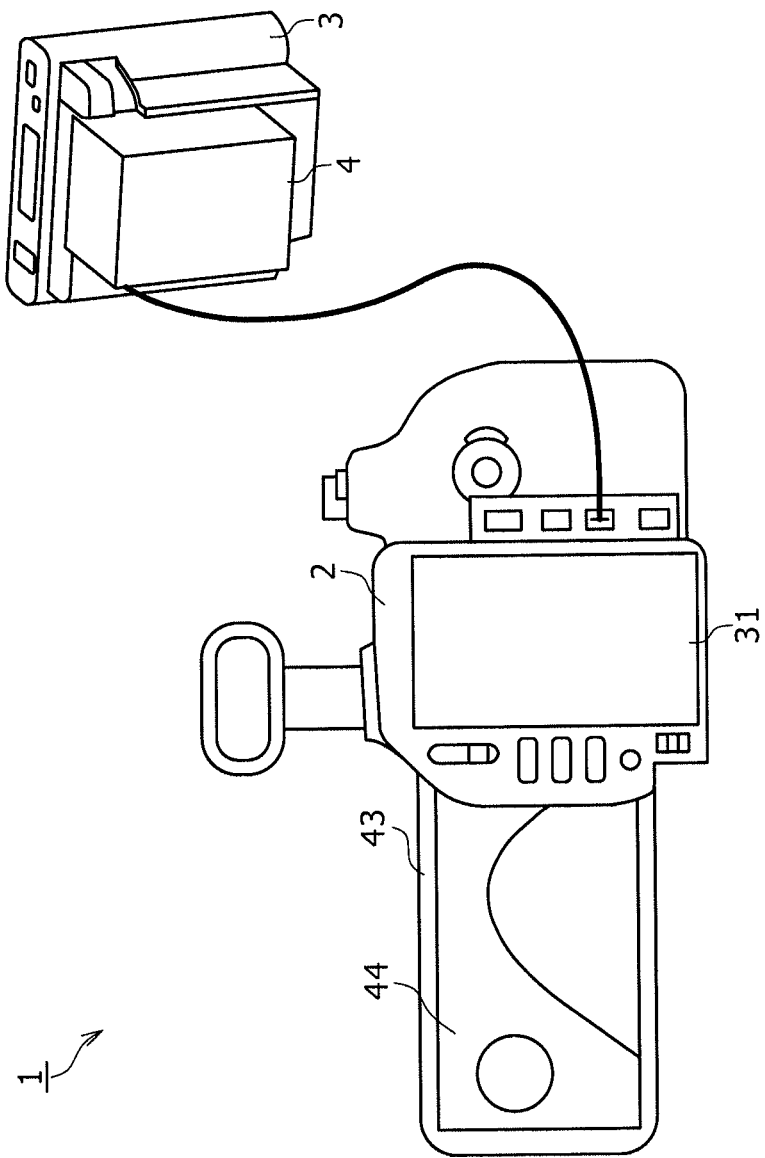
FIG. 1 is a schematic diagram illustrating a recording/reproducing system according to a first embodiment of the present invention.

FIG. 1 is a block diagram illustrating a recording/reproducing system according to a first embodiment of the present invention. This recording/reproducing system 1 is constructed of a camera-integrated video tape recorder 2 and an external recording apparatus 3 connected thereto. Here, the external recording apparatus 3 is a recording/reproducing apparatus that uses a high-capacity hard disk drive for a recording medium, and which is capable of being connected to various types of video equipment, including the camera-integrated video tape recorder 2, or information equipment such as a computer. This external recording apparatus 3 has various types of operation units provided thereon, and operates while accepting various settings entered by operations on the various types of operation units, and also displays a status that may indicate various statuses such as "during recording." In addition, when connected to a main apparatus such as the camera-integrated video tape recorder, the external recording apparatus 3 operates while accepting various settings via this main apparatus, and also notifies the main apparatus of various statuses.

Figure 2:
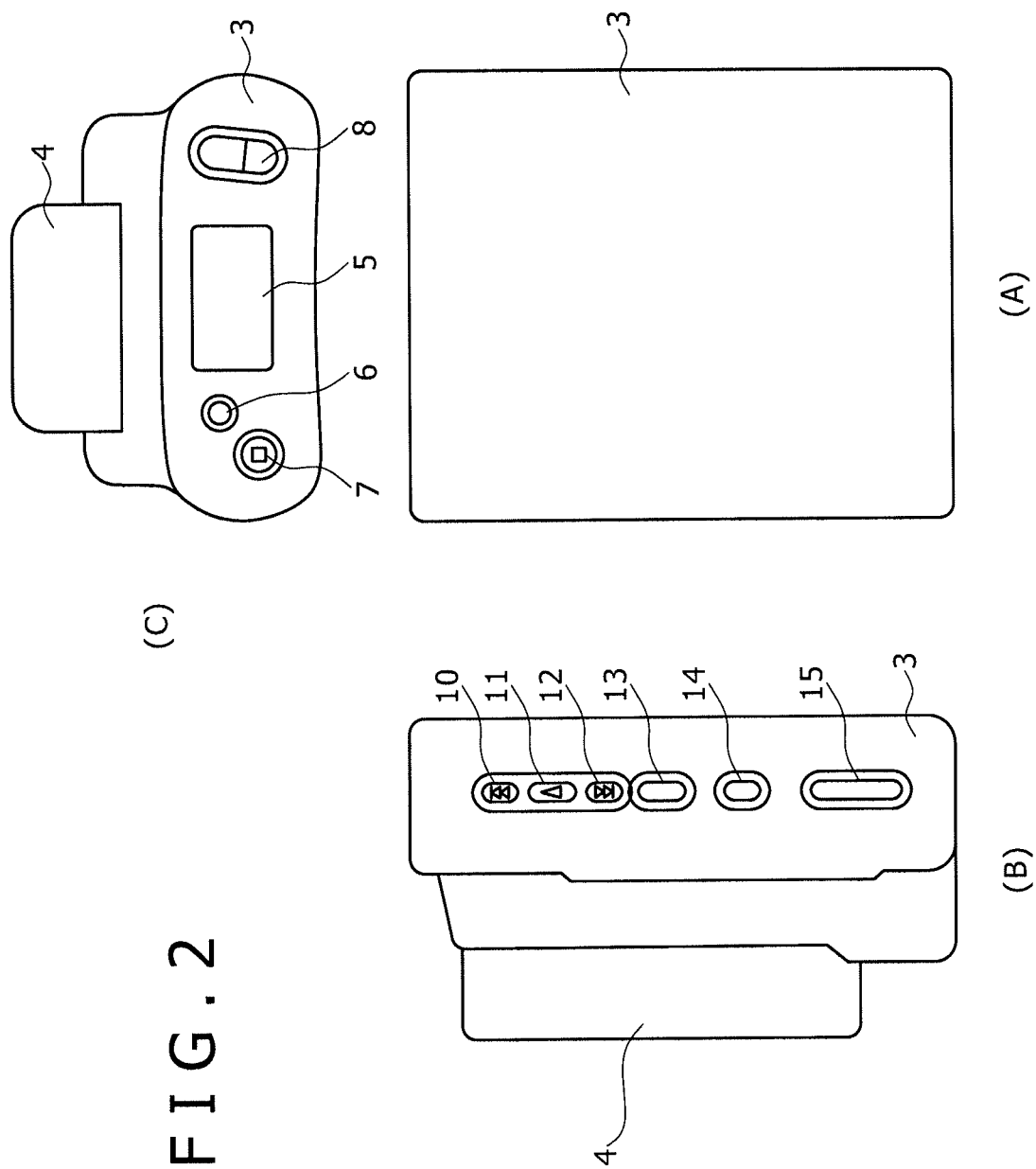
FIG. 2(A), FIG. 2(B), and FIG. 2(C) are a front view, a side view, and a plan view of an external recording apparatus in the recording/reproducing system of FIG. 1.

Here, referring to a front view, a side view, and a plan view of the external recording apparatus 3 as shown in FIG. 2(A), FIG. 2(B), and FIG. 2(C), the external recording apparatus 3 has the shape of a slightly circular, approximate rectangular parallelepiped, and has a battery 4 removably secured to its rear. In addition, the external recording apparatus 3 has provided on its upper side: a display section 5 for displaying the various statuses, a menu screen, and so on; a menu display operation unit 6 for issuing an instruction to cause the display section 5 to display the menu screen; a stop operation unit 7 for causing the display section 5 to stop displaying the menu screen; and a recording operation unit 8 for issuing an instruction to start recording. In addition, the external recording apparatus 3 has provided on its side: a fast-forward operation unit 10; a play operation unit 11; a rewind operation unit 12; a repeat play operation unit 13; a link switch operation unit 14 for switching between operation according to remote control from the main apparatus and operation according to operations on the operation units on the external recording apparatus 3; a power operation unit 15; a connector for connection with the main apparatus; and so on.

While the menu screen is displayed on the display section 5, the fast-forward operation unit 10 and the rewind operation unit 12 function as operation units for moving a cursor displayed on the menu screen, and the play operation unit 11 functions as an enter operation unit for issuing an instruction to select a menu indicated by the cursor. While the menu screen is not displayed, the stop operation unit 7 functions as a play stop operation unit for issuing an instruction to stop playback. If the power operation unit 15 is operated at the central position, power is turned off, whereas if a slide operation is carried out upward or downward from the central position, the power is turned on to start a video mode or a computer mode, respectively. Note here that the video mode and the computer mode refer to an operation mode in which the external recording apparatus operates as an external recording apparatus for the video equipment and an operation mode in which the external recording apparatus operates as an external recording apparatus for the computer, respectively.

Figure 3:
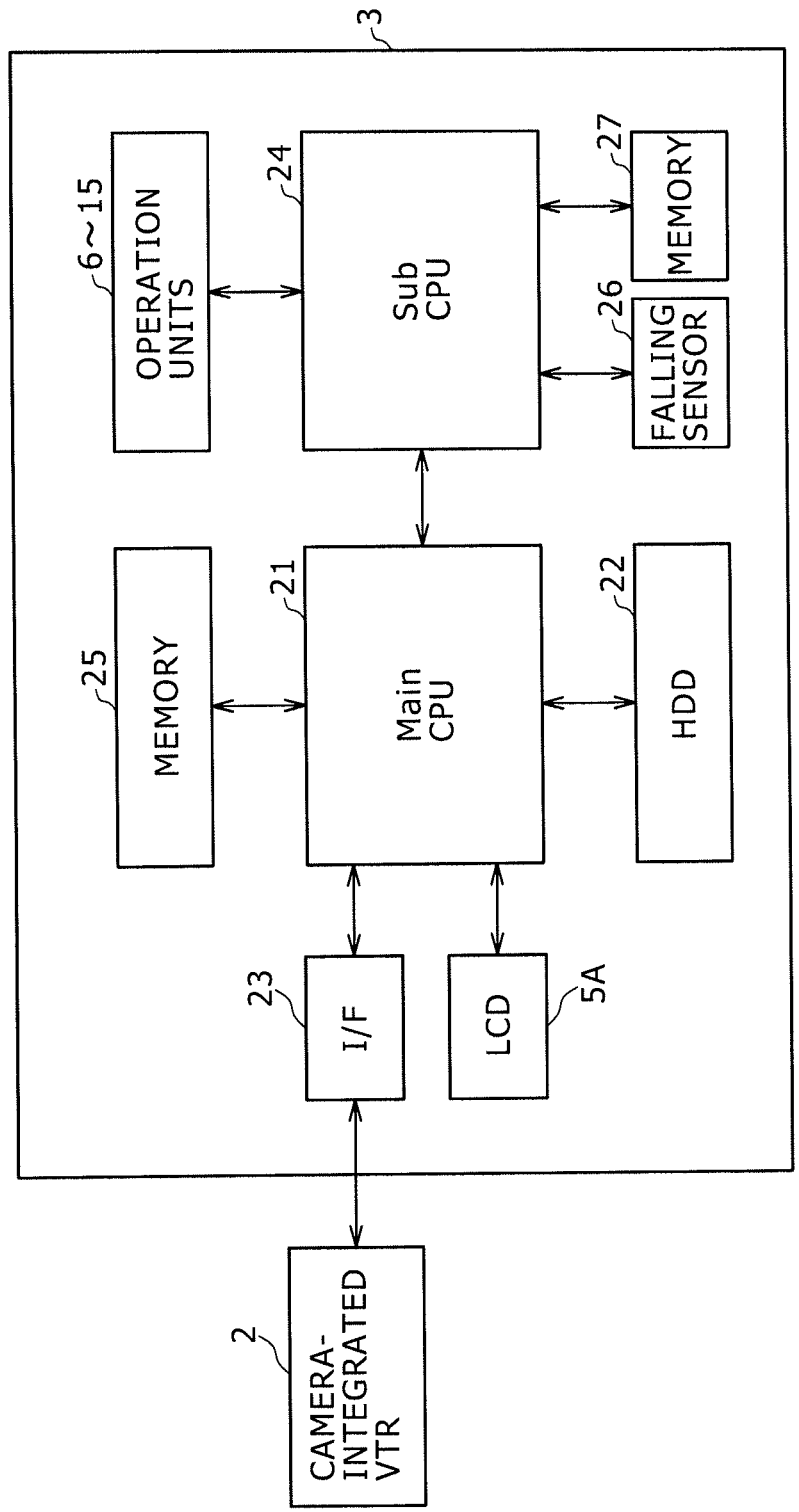
FIG. 3 is a block diagram illustrating the external recording apparatus in the recording/reproducing system of FIG. 1.

FIG. 3 is a block diagram illustrating the structure of the external recording apparatus 3. In the external recording apparatus 3, a liquid crystal display device (LCD) 5A forms the display section 5 and, under control of a main CPU 21, displays the menu screen, the status, and so on. A hard disk drive (HDD) 22 has a partition for the video mode and a partition for the computer mode, and under control of the main CPU 21, the hard disk drive 22 records data outputted from the main CPU 21 on an appropriate one of the partitions, and also reproduces the recorded data therefrom and outputs it to the main CPU 21. An interface (I/F) 23 is an IEEE 1394 input/output circuit, and under control of the main CPU 21, the interface 23 inputs or outputs various types of data from or to the main apparatus.

Under control of a sub-CPU 24 and the main apparatus, the main CPU 21 transmits or receives various commands or statuses to or from the main apparatus via the interface 23. In addition, the main CPU 21 receives video data, audio data, and so on from the main apparatus via the interface 23, and records the received data on the hard disk drive 22. In addition, conversely, the main CPU 21 reproduces the data from the hard disk drive 22, and outputs the reproduced data to the main apparatus via the interface 23. The main CPU 21 uses a memory 25 as a buffer memory to record or reproduce the data, and when in the video mode, the main CPU 21 performs a process of cache recording. Note here that the "cache recording" refers to a recording mode in which the video data and the audio data are sequentially recorded on the memory 25 cyclically while waiting for start of the recording, and if an instruction to start the recording is issued, the recording is stared with the video data and the audio data recorded on the memory 25 so that extra data corresponding to a period of several seconds prior to the issuance of the instruction to start the recording will be recorded.

In addition, the main CPU 21 transmits or receives, to or from the sub-CPU 24, various types of data necessary for processing by the sub-CPU 24. Moreover, upon notification from the sub-CPU 24 of detection of a falling, the main CPU 21 instructs the hard disk drive 22 to retract a head thereof. Still further, the main CPU 21 displays various types of information provided from the sub-CPU 24 on the display section 5. Note here that examples of the information displayed include the menu screen and the status (e.g., statuses, such as "during recording" or "during playback," a time code, remaining battery life of the battery 4, etc.) of the external recording apparatus 3.

A falling sensor 26 is an acceleration sensor, and detects a falling of the external recording apparatus 3 and notifies the sub-CPU 24 of the falling. A memory 27 is formed by an EEPROM, for example, and records and holds a program for the sub-CPU 24 and various types of data necessary for execution of this program. Thus, in this external recording apparatus 3, the program executed by the sub-CPU 24 is provided by being installed in the external recording apparatus 3 beforehand. Alternatively, the program may be provided by being recorded on a recording medium such as an optical disc, a magnetic disk, or a memory card, or may be provided by being downloaded via a network such as the Internet.

The sub-CPU 24 executes the program recorded on the memory 27 to monitor the operation on any of the operation units 6 to 15 and accept various types of settings, and also controls operations of various parts. In addition, the sub-CPU 24 controls an operation of the main CPU 21 to display the menu screen and the status on the display section 5. Moreover, the sub-CPU 24 monitors for the connection of the main apparatus, and if the main apparatus is connected, the sub-CPU 24 accepts various settings from the main apparatus, and also controls operations of various parts. Still further, the sub-CPU 24 notifies the main apparatus of the status so that the main apparatus can display the various statuses.

Specifically, the sub-CPU 24 instructs the main CPU 21 to display the menu screen in accordance with an operation on the operation unit 6. In addition, in a situation where the menu screen is displayed, the sub-CPU 24 changes the display on the menu screen and accepts various settings in accordance with operations on the operation units 7 and 10 to 13.

Figure 4:
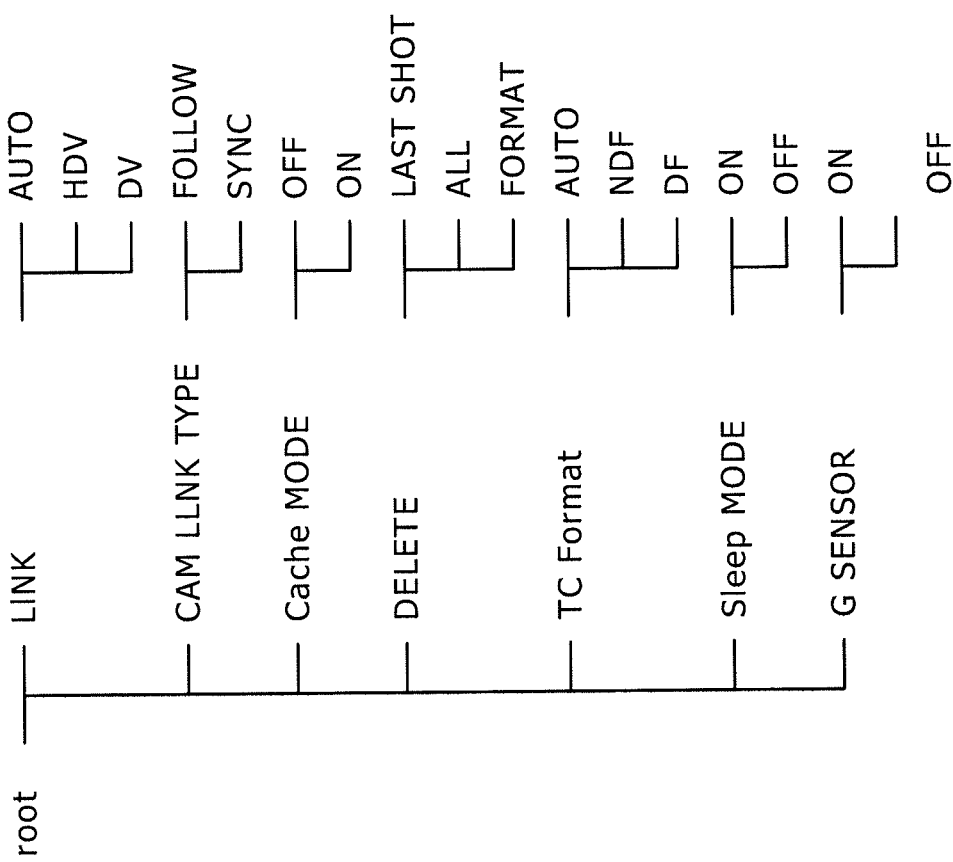
FIG. 4 is a schematic diagram for explaining about a menu screen in the external recording apparatus of FIG. 3.

Here, FIG. 4 shows menus displayed on this menu screen. If a user operates the operation unit 6 to issue the instruction to display the menu screen, the sub-CPU 24 displays menus (LINK, CAM LINK TYPE, Cache Mode, and so on) on a level next to a root. In addition, in accordance with an operation on the operation unit 10 or 12, the sub-CPU 24 scrolls across the display of the menus sequentially and cyclically, and moves the position of the cursor. Moreover, in response to an operation on the operation unit 11, the sub-CPU 24 switches the display on the menu screen to a level subordinate to the menu selected by the cursor, and in a similar manner, in accordance with an operation on the operation unit 10 or 12, the sub-CPU 24 moves the position of the cursor. Still further, the sub-CPU 24 accepts the selection of a menu in response to an operation on the operation unit 11, and controls the configuration and operation of various parts in accordance with the selected menu. Still further, the sub-CPU 24 stops displaying the menu screen in response to an operation on the operation unit 7.

Here, LINK is a menu for setting a recording format of the hard disk drive 22. AUTO is a menu for selecting automatic setting, HDV is a menu for selecting a recording format of HDTV (High Definition Television), and DV is a menu for selecting a recording format of the DV system. CAM LINK TYPE is a setting menu for a coordinated operation with the main apparatus. Cache Mode is a setting menu for On/Off of the cache recording. DELETE is a menu for file deleting. LAST SHOT is a menu for deleting a file that has been recorded last, ALL is a menu for deleting all recorded files, and FORMAT is a menu for issuing an instruction for formatting. TC Format and Sleep Mode are a menu for setting a format of the time code and a menu for setting the sleep mode, respectively. G Sensor is a menu for setting as to whether the falling sensor 26 is to be used to retract the head.

The sub-CPU 24 controls the operations of various parts in accordance with the setting as specified using this menu screen. Specifically, if the recording operation unit 8 is operated in a situation where the menu screen is not displayed, the sub-CPU 24 instructs the main CPU 21 to record the data inputted via the interface 23, so that the data sequentially inputted is recorded on the hard disk drive 22. In the case where, at this time, the recording format of the hard disk drive 22 is set to AUTO by the setting specified using the menu screen, the main CPU 21 determines whether or not the data sequentially inputted is HDTV video data, and the recording format is switched in accordance with a result of this determination. Meanwhile, in the case where the recording format is set to HDV or DV, the data sequentially inputted is recorded in the recording format of the HDTV format or the DV format, respectively. In the case where this data includes the video data and the audio data and the cache recording has been set to on by the user, the main CPU 21 is controlled to carry out the cache recording. In the case where the format of the time code is set to AUTO, time code values in the video data sequentially inputted are recorded, whereas in the case where the format of the time code is set to NDF or DF, the time code values in the video data sequentially inputted are converted into a format corresponding to the setting, before being recorded.

Still further, if the stop operation unit 7 is operated during the recording, the sub-CPU 24 controls the main CPU 21 to stop the recording. In addition, the sub-CPU 24 controls the main CPU 21 to display, on the display section 5, the status such as "during recording" or "during playback," the remaining battery life, the time code, and so on.

Still further, if the play operation unit 11 is operated in the situation where the menu screen is not displayed, the sub-CPU 24 instructs the main CPU 21 to reproduce a file that has been recorded most recently, so that the file in question recorded on the hard disk drive 22 is reproduced therefrom. In addition, the sub-CPU 24 controls the operations of various parts to output the reproduced data via the interface 23. Still further, if the fast-forward operation unit 10 or the rewind operation unit 12 is operated in a situation where a file is being played, the file being played is fast-forwarded or rewound. If the stop operation unit 7 is operated, the playing operation is controlled to stop. Still further, if the repeat play operation unit 13 is operated, the file being played is rewound by a predetermined period of time and then played from that point, so that the same portion is played repetitively.

Meanwhile, if the main CPU 21 detects the connection of the main apparatus, the sub-CPU 24 controls the main CPU 21 to establish the connection with the main apparatus. In addition, in response to a request from the main apparatus, the sub-CPU 24 provides the various menus as described above with reference to FIG. 4 (i.e., a menu list, which will be described later) to the main apparatus, and accepts the selection of any of the menus from the main apparatus, thereby accepting various settings with the main apparatus. Moreover, under control of the main apparatus, the sub-CPU 24 controls the operations of various parts in similar manners to those in which the sub-CPU 24 controls the operations of the various parts when the operation units 7 to 14 have been operated. Still further, the sub-CPU 24 outputs information about the status to the main apparatus so that the main apparatus can display various statuses.

Still further, if the operation unit 14 is operated to select the remote control by the main apparatus, the sub-CPU 24 sequentially inputs the video data and the audio data outputted from the main apparatus, and records the sequentially inputted video data and audio data in accordance with instructions from the main apparatus to start and stop the recording.

FIG. 5(A) and FIG. 5(B) are a side view and a rear view of the camera-integrated video tape recorder 2, which is the main apparatus. Note that the side view illustrates the state of the camera-integrated video tape recorder 2 with a lens removed therefrom. The camera-integrated video tape recorder 2 has an electronic viewfinder 30 provided on its upper side, and has a battery 31 removably secured to its rear. In addition, the camera-integrated video tape recorder 2 has provided on its rear: an operation unit 32 for switching a camera setting between auto and manual operations; an operation unit 33 for gain control; an operation unit 34 for setting a shutter speed; and an operation unit 35 for white balance control. Note that the operation units 33 to 35 are configured to be operable when the manual operation is enabled by an operation on the operation unit 32. Moreover, the camera-integrated video tape recorder 2 has provided on its rear: an operation unit 36 for issuing an instruction to display a menu screen; and a rotatable operation unit 37, which is capable of accepting a pressing operation and used to move a cursor on the menu screen and select a menu. In addition, the camera-integrated video tape recorder 2 has provided on its right side: an operation unit 39 for recording start/stop; a power operation unit 40; an operation unit 41 for a zooming operation; and an operation unit 42 for issuing an instruction to record a still image.

The camera-integrated video tape recorder 2 has provided on its left side a door 43 that can be opened and closed. A monitoring-use display section 44, formed by a liquid crystal display device, is provided inside the door 43. The camera-integrated video tape recorder 2 also has provided on its left side: a camera manual operation unit 45 for switching the operation of an optical system of the camera-integrated video tape recorder 2 to a manual operation; an operation unit 46 for manually operating the optical system; an operation unit 47 for autofocus; operation units 48 to 50 for various user settings; a filter On/Off operation unit 51; an operation unit 52 for switching a range of focus adjustment; and an operation unit 53 for manually adjusting the focus. In addition, the camera-integrated video tape recorder 2 has provided on a portion that is covered by the door 43 when the door 43 is closed: operation units 55 to 59 for playback stop, rewinding, playback, fast-forwarding, slow playback, and so on; operation units 60 to 62 for pause, recording, and so on; an operation unit 63 for volume control; an operation unit 64 for setting so-called zebra display; an operation unit 65 concerning a display on the display section 44; and operation units 66 to 68 for various user settings. Moreover, an operation unit 70 for selecting an image quality adjustment profile and an operation unit 71 for checking various statuses are provided below the door 43.

Figure 6:
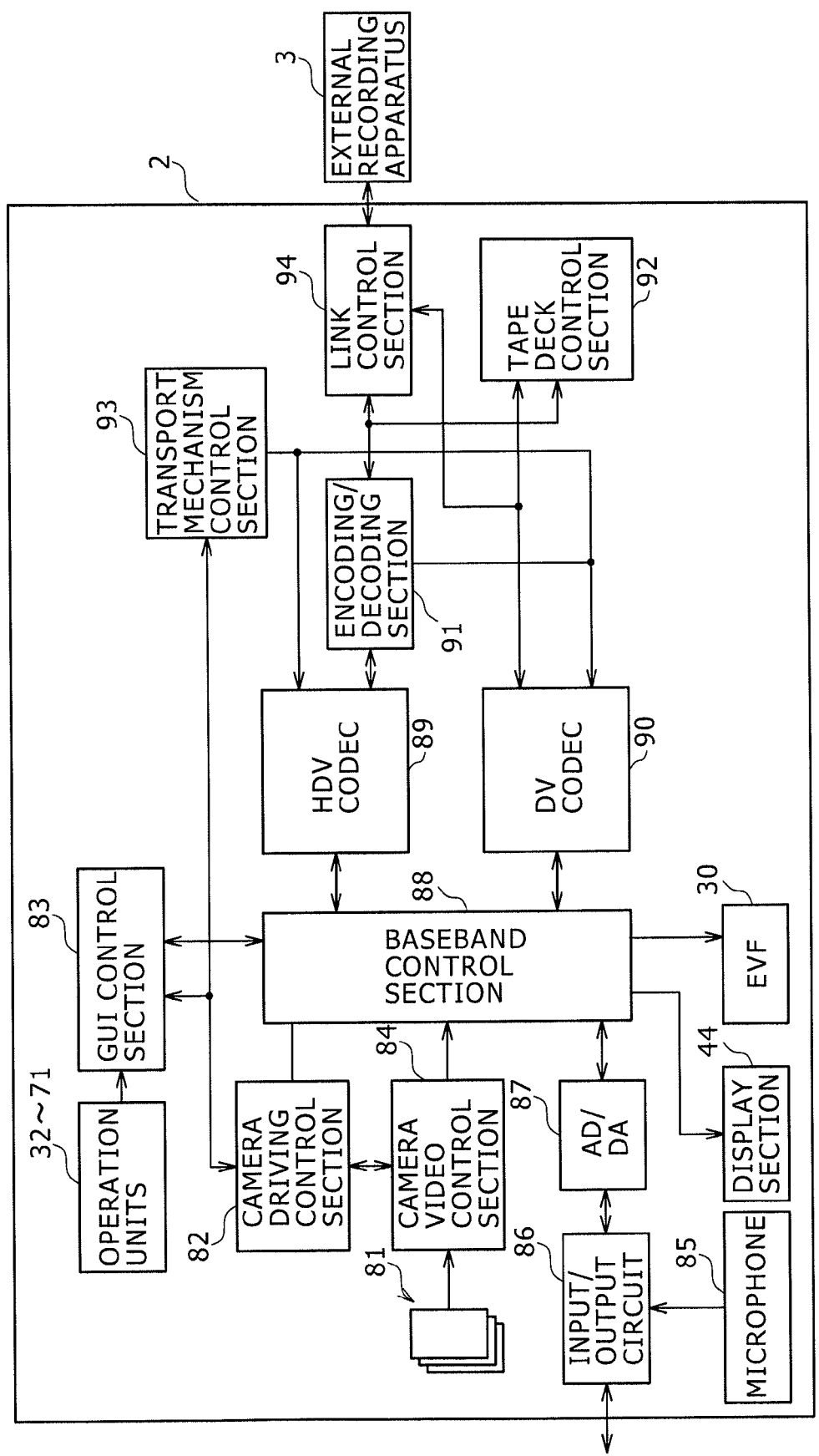
FIG. 6 is a block diagram illustrating the camera-integrated video tape recorder in the recording/reproducing system of FIG. 1.

FIG. 6 is a block diagram illustrating the camera-integrated video tape recorder 2. In the camera-integrated video tape recorder 2, an imaging device 81 is a CMOS (Complementary Metal-Oxide Semiconductor) sensor, for example, and subjects an optical image formed on an imaging surface to an optical-to-electrical conversion process and outputs a result. Under control of a GUI (Graphical User Interface) control section 83, a camera driving control section 82 controls a camera video control section 84 and the optical system. The camera video control section 84 subjects a signal outputted from the imaging device 81 to signal processing, and outputs video data of an imaging result to a baseband control section 88. A microphone 85 captures a sound from a subject to be imaged, and outputs a corresponding audio signal. An input/output circuit 86 amplifies the audio signal outputted from the microphone 85, and outputs the amplified audio signal. An AD/DA circuit 87 subjects the audio signal outputted from the input/output circuit 86 to an analog/digital conversion circuit process, and outputs the resulting audio data to the baseband control section 88. The camera-integrated video tape recorder 2 is capable of reproducing a video signal and an audio signal recorded on a recording medium, and outputting the reproduced video and audio signals to an external device. In that case, the AD/DA circuit 87 converts audio data outputted from the baseband control section 88 into analog form and outputs the resulting analog signal, and the input/output circuit 86 outputs this analog signal to the external device.

The baseband control section 88 switches its operation in accordance with control of the GUI control section 83, and, at the time of recording the imaging result, processes the video data outputted from the camera video control section 84 and the audio data outputted from the AD/DA circuit 87, and outputs the resulting video and audio data to an HDV codec 89 or a tape deck control section 92. In addition, the baseband control section 88 displays a monitor image of the imaging result on the display section 44 and the electronic viewfinder (EVF) 30. Moreover, in a situation where the monitor image is being displayed, the baseband control section 88 presents an onscreen display of various statuses specified by the GUI control section 83. Still further, in response to an instruction from the GUI control section 83 to display the menu screen, the baseband control section 88 displays the menu screen on the display section 44 and the electronic viewfinder 30.

Meanwhile, in the case where the imaging result is reproduced for monitoring, the baseband control section 88 acquires the video data and the audio data from the HDV codec 89 or the tape deck control section 92, and displays a monitor image of the video data on the display section 44 and the electronic viewfinder 30. In this case also, in the situation where the monitor image is being displayed, the baseband control section 88 presents an onscreen display of a status specified by the GUI control section 83, and also displays the menu screen.

In the case where the imaging result is to be recorded in HDTV format, the HDV codec 89 converts the video data outputted from the baseband control section 88 into corresponding HDTV video data, and outputs the HDTV video data to an encoding/decoding section 91 together with the audio data outputted from the baseband control section 88. Meanwhile, in the case where the imaging result is reproduced for monitoring and this imaging result is recorded in HDTV format, the HDV codec 89 receives the video data and the audio data outputted from the encoding/decoding section 91, performs the inverse of the process performed at the time of recording, and outputs the resulting video and audio data to the baseband control section 88.

In the case where the imaging result is to be recorded in DV format, a DV codec 90 converts the video data outputted from the baseband control section 88 into DV format, and outputs the resulting video data to the tape deck control section 92 together with the audio data outputted from the baseband control section 88. Meanwhile, in the case where the imaging result is reproduced for monitoring and this imaging result is recorded in DV format, the DV codec 90 receives the video data and the audio data outputted from the tape deck control section 92, performs the inverse of the process performed at the time of recording, and outputs the resulting video and audio data to the baseband control section 88.

In the case where the imaging result is to be recorded in HDTV format, the encoding/decoding section 91 encodes the video data and the audio data outputted from the HDV codec 89, and outputs the resulting video and audio data to the tape deck control section 92. Meanwhile, in the case where the imaging result is reproduced for monitoring and this imaging result is recorded in HDTV format, the encoding/decoding section 91 decodes a bit stream outputted from the tape deck control section 92 to obtain corresponding video and audio data, and outputs the video and audio data to the HDV codec 89.

The tape deck control section 92 controls a magnetic tape transport system under control of a transport mechanism control section 93, and records the data outputted from the encoding/decoding section 91 or the DV codec 90 on a magnetic tape sequentially. Meanwhile, at the time of reproducing, the tape deck control section 92 reproduces the video data and the audio data from the magnetic tape, and outputs the reproduced video and audio data to the encoding/decoding section 91 or the DV codec 90.

Accordingly, in the camera-integrated video tape recorder 2, the imaging result obtained by the imaging device 81 is processed by the baseband control section 88 and displayed by the display section 44 and the electronic viewfinder 30, so that the monitor image of the imaging result is displayed. Further, in the case where the imaging result is to be recorded in HDTV format, the video data and the audio data outputted from the baseband control section 88 are processed by the HDV codec 89, the encoding/decoding section 91, and the tape deck control section 92 sequentially so as to be recorded on the magnetic tape. Still further, in the case where the imaging result is to be recorded in DV format, the video data and the audio data outputted from the baseband control section 88 are processed by the DV codec 90 and the tape deck control section 92 sequentially so as to be recorded on the magnetic tape.

Still further, in the case where the imaging result recorded on the magnetic tape is to be reproduced for monitoring and this imaging result is recorded in HDTV format, the imaging result outputted from the magnetic tape is processed by the tape deck control section 92, the encoding/decoding section 91, and the HDV codec 89 sequentially to reproduce the original video data and the original audio data, and the reproduced video data is processed by the baseband control section 88 and displayed on the display section 44 and the electronic viewfinder 30. Meanwhile, in the case where the imaging result is recorded in DV format, the imaging result outputted from the magnetic tape is processed by the tape deck control section 92 and the DV codec 90 sequentially to reproduce the video data and the audio data, and the reproduced video data is processed by the baseband control section 88 and displayed on the display section 44 and the electronic viewfinder 30.

A LINK control section 94 is an IEEE 1394 input/output circuit, and if the external device is connected thereto, the LINK control section 94 establishes connection with this external device under control of the transport mechanism control section 93 to input or output various types of data from or to the external device. In addition, the LINK control section 94 inputs or outputs video data and audio data from or to the external device, and depending on the format of the video data inputted or outputted, the LINK control section 94 transmits or receives, to or from the tape deck control section 92, the encoding/decoding section 91, or the DV codec 90, the video data and the audio data inputted or outputted from or to the external device.

The transport mechanism control section 93 is a control circuit for controlling a recording/reproducing system of the camera-integrated video tape recorder 2, and controls various parts under control of the GUI control section 83.

The GUI control section 83 is processing means that executes a program recorded on a memory (not shown), and controls an operation of the whole camera-integrated video tape recorder 2 via the camera driving control section 82 and the transport mechanism control section 93. Thus, in the camera-integrated video tape recorder 2, the program executed by the GUI control section 83 is provided by being installed in the camera-integrated video tape recorder 2 beforehand. Alternatively, the program may be provided by being recorded on a recording medium such as an optical disc, a magnetic disk, or a memory card, or may be provided by being downloaded via a network such as the Internet.

Specifically, in accordance with an operation on the operation unit 36, the GUI control section 83 displays the menu screen on the display section 44 and the electronic viewfinder 30, and accepts settings for various parts via the selection of menus on this menu screen. If the external recording apparatus 3 is not connected to the camera-integrated video tape recorder 2 at this time, the GUI control section 83 accepts only settings for the camera-integrated video tape recorder 2 via the menu screen displayed.

FIG. 7 shows plan views of the menu screen in the case where the external recording apparatus 3 is not connected to the camera-integrated video tape recorder 2. If the operation unit 36 is pressed, the GUI control section 83 displays a menu in which setting targets are classified as shown in FIG. 7(A). Here, "x" is a menu for finishing the displaying, "Camera" and "Memory" are menus for selecting an imaging section and a recording/reproducing section, respectively, and "Main" is a menu for selecting items that concern neither the imaging section nor the recording/reproducing section. In accordance with a rotating operation on the operation unit 37, the GUI control section 83 moves the cursor on this menu screen, and in accordance with a pressing operation on the operation unit 37, the GUI control section 83 accepts the selection of a menu at the position of the cursor.

In response to the selection of this menu, the GUI control section 83 displays menus on a subordinate level as shown in FIG. 7(B). Then, the GUI control section 83 accepts selection of one of the menus on this subordinate level in accordance with an operation on the operation unit 37, and displays menus on a further subordinate level as shown in FIG. 7(C) to accept a setting for the camera-integrated video tape recorder 2.

Figure 8:
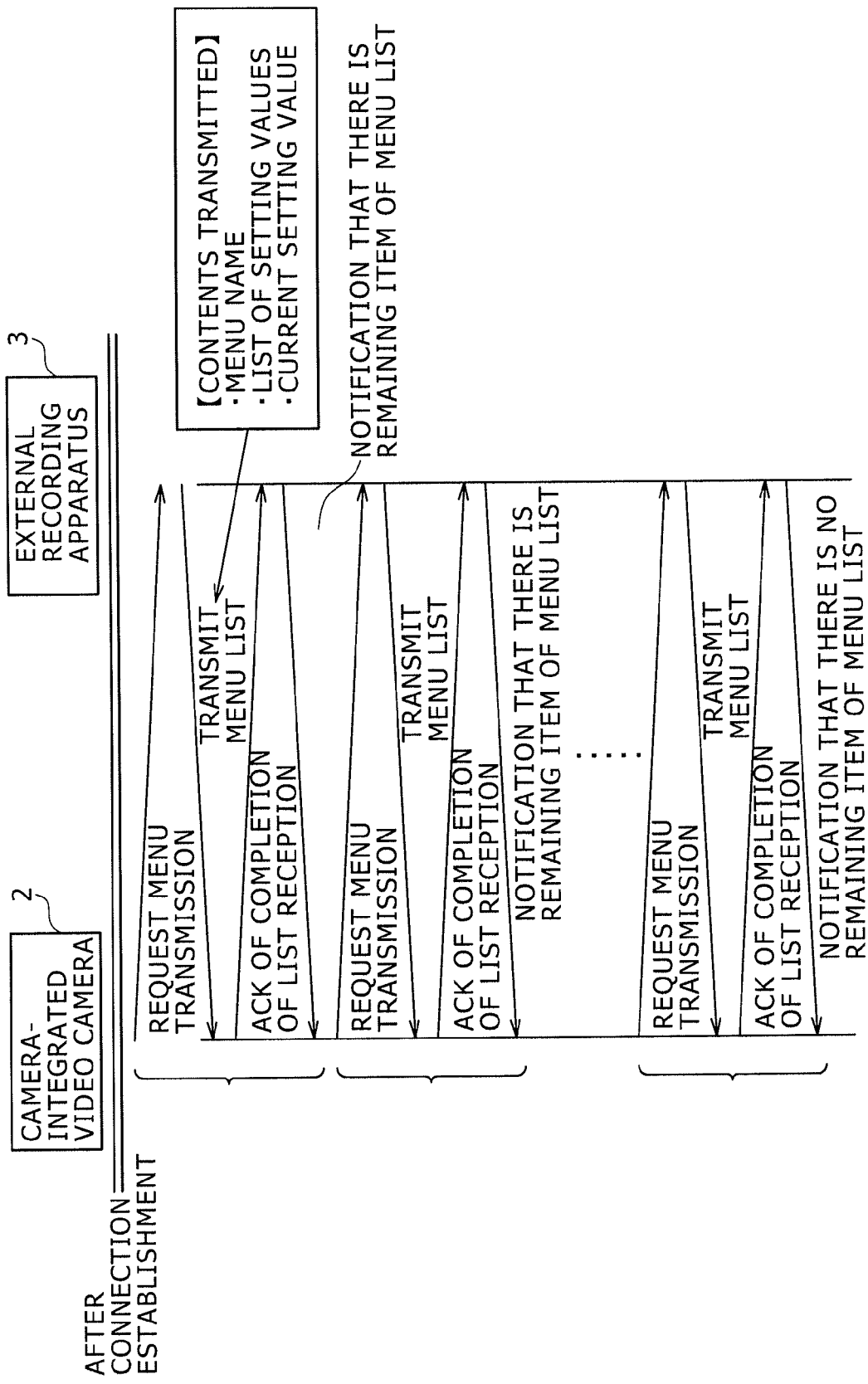
FIG. 8 is a time chart for explaining about displaying of a menu screen of FIG. 9.

Meanwhile, in the case where the external recording apparatus 3 is connected to the camera-integrated video tape recorder 2, a setting for the external recording apparatus 3 is also accepted via the menu screen displayed. Thus, upon detection by the LINK control section 94 of the connection of the external device, the GUI control section 83 performs a procedure as shown in FIG. 8 to acquire a menu list, which is information about menus to be displayed on the menu screen. Specifically, upon detection by the LINK control section 94 of the connection of the external device, the GUI control section 83 controls the operation of the LINK control section 94 to establish the connection with the external device. After establishing the connection therewith, the GUI control section 83 requests, via the LINK control section 94, the external device to transmit the menu list. If no response is obtained to this request to the external device, the GUI control section 83 terminates the procedure of FIG. 8, and displays the same menu screen as that which is displayed when the external device is not connected to the camera-integrated video tape recorder 2, and accepts only the settings for the camera-integrated video tape recorder 2.

Meanwhile, in the case where this external device is the external recording apparatus 3, the menu list is sent therefrom in response to the above request, and the GUI control section 83 acquires this menu list. Here, this menu list is a list of the menus immediately below the root, i.e., LINK, CAM LINK TYPE, Cache Mode, and so on as described above with reference to FIG. 4. To each of them are assigned: a menu name; a list of selectable setting values, which are menu items on a subordinate level; and one of the setting values in the list which is currently set in the external recording apparatus 3.

Upon acquisition of one menu list, the GUI control section 83 notifies the external device of completion of the reception of the menu list. After the notification of the completion of the reception thereof, the external recording apparatus 3 provides notification that there is a remaining menu list if there is a menu list that remains to be transmitted, or provides notification that all menu lists have been transmitted if all the menu lists have already been transmitted.

In accordance with the notification, the GUI control section 83 continues to request and acquire menu lists until it receives all the menu lists, and when it has received all the menu lists, the GUI control section 83 finishes the procedure of FIG. 8. As a result of the procedure of FIG. 8, the GUI control section 83 acquires information about each item displayed on the menu screen of the external recording apparatus 3 as described above with reference to FIG. 4.

Figure 10:
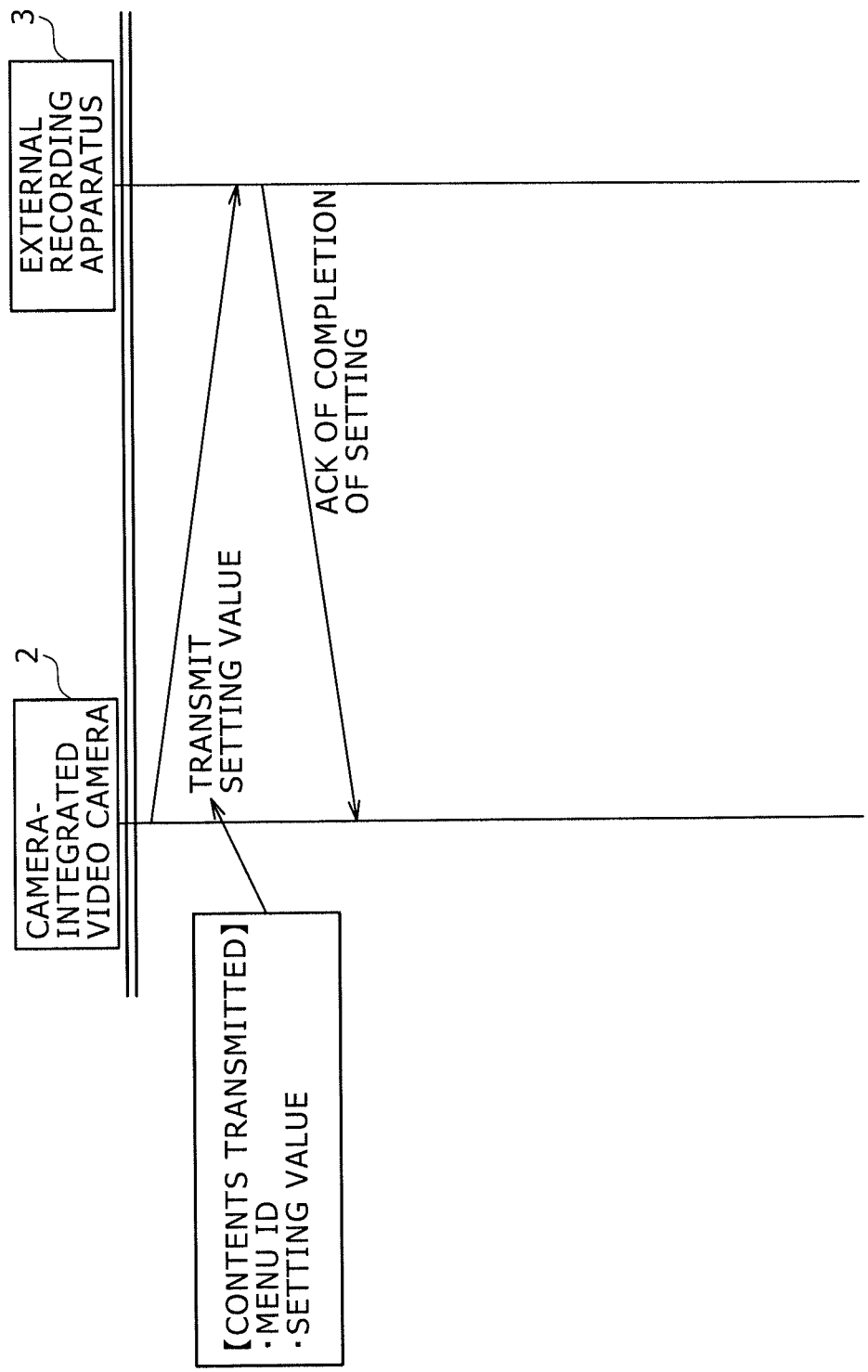
FIG. 10 is a time chart for explaining setting of the external recording apparatus.

If the user operates the operation unit 36 to issue the instruction to display the menu screen after the information about each item displayed on the menu screen of the external recording apparatus 3 is acquired in the above-described manner, an external device menu is displayed on the menu in which the setting targets are classified, which is displayed in the case where the external device is not connected to the camera-integrated video tape recorder 2, as illustrated in FIG. 9(A) in contrast to FIG. 7(A). Then, if the external device menu is selected in accordance with an operation on the operation unit 37, a list of the menu names described in the menu lists acquired as a result of the procedure of FIG. 8 is displayed as shown in FIG. 9(B). Then, a selection of one of the menus in this list displayed is accepted in accordance with an operation on the operation unit 37, and specific settings are displayed as shown in FIG. 9(C). At this time, the GUI control section 83 first displays a cursor at the position of the current setting, thereby notifying the user of the current setting in the external device. Then, a selection of one of the specific settings is accepted in accordance with an operation on the operation unit 37. Then, the setting the selection of which has been accepted is notified to the external recording apparatus 3 in accordance with a procedure as illustrated in FIG. 10, so that the setting is made in the external recording apparatus 3.

Specifically, if the user selects a lowest-level menu in connection with the external recording apparatus 3, the GUI control section 83 provides the external recording apparatus 3 with a menu ID that identifies a menu on a level superior to the selected menu and a setting value corresponding to the selected menu, receives notification that the setting has been completed from the external recording apparatus 3, and finishes this procedure. Note here that menu IDs are IDs specific to individual menu lists, and that the menu IDs are set in order of transmission in the procedure of FIG. 8, for example.

Figure 11:
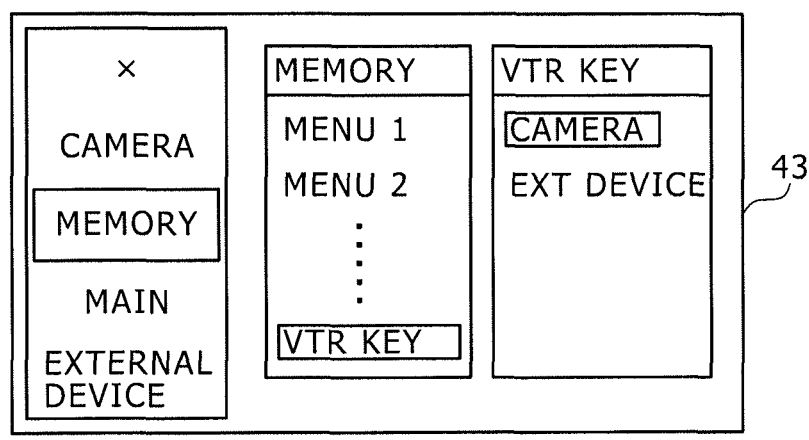
FIG. 11 is a plan view for explaining setting of a reproducing target.

If the user selects the Memory menu in the menu screen displayed, the GUI control section 83 displays various setting items in connection with the recording/reproducing system to accept a selection by the user. In the case where the external recording apparatus 3 is connected to the camera-integrated video tape recorder 2 at this time, a menu (VTR KEY) for selecting a reproducing target is displayed, in addition to the other menus to be displayed, as shown in FIG. 11. If this menu (VTR KEY) for selecting the reproducing target is selected, a menu (CAMERA) for selecting the camera-integrated video tape recorder 2 and a menu (EXT DEVICE) for selecting the external recording apparatus 3 are displayed. If the menu (CAMERA) for selecting the camera-integrated video tape recorder 2 is selected, the magnetic tape loaded on the camera-integrated video tape recorder 2 is set as the reproducing target, whereas if the menu (EXT DEVICE) for selecting the external recording apparatus 3 is selected, the external recording apparatus 3 is set as the reproducing target.

Meanwhile, the GUI control section 83 acquires the imaging result in response to an operation on the operation unit 40, and displays the monitor image on the display section 44 and the electronic viewfinder 30. If the operation unit 39 is operated in this situation, this imaging result is recorded on the magnetic tape in the format set by the user with the menu screen. At this time, if the external device is connected to the camera-integrated video tape recorder 2 and this external device is a recording apparatus, the video data and the audio data are outputted to this external device. Further, each time the operation unit 39 is operated, the instruction to start the recording or the instruction to stop the recording is notified to the external device in response to the operation on the operation unit 39. The determination as to whether or not this external device is a recording apparatus is made based on type of the external device detected when the connection with this external device is established, for example.

As a result of the notification to the external device, the external recording apparatus 3 connected to the camera-integrated video tape recorder 2 sequentially records the imaging result on the hard disk drive 22 in accordance with the setting made with the menu screen of the camera-integrated video tape recorder 2 or the setting made with the menu screen of the external recording apparatus 3, in accordance with an operation on the operation units in the camera-integrated video tape recorder 2, in the case where the remote control by the main apparatus is selected by the operation unit 14.

Further, if any of the operation units 55 to 59 in connection with the reproducing is operated in the situation where the external device is not connected to the camera-integrated video tape recorder 2, the GUI control section 83 controls the operations of various parts in accordance with an operation on the operation units 55 to 59, and reproduces the imaging result recorded on the magnetic tape to display the monitor image. Even in the case where the external recording apparatus 3 is connected to the camera-integrated video tape recorder 2, if the camera-integrated video tape recorder 2 is set as the reproducing target (see FIG. 10), the GUI control section 83 controls the operations of various parts in accordance with an operation on the operation units 55 to 59, and reproduces the imaging result recorded on the magnetic tape to display the monitor image.

Meanwhile, in the case where the external recording apparatus 3 is set as the reproducing target in the situation where external recording apparatus 3 is connected to the camera-integrated video tape recorder 2, the GUI control section 83 notifies the external recording apparatus 3 of the operation performed on any of the operation units 55 to 59, and remotely controls the external recording apparatus 3 to reproduce the video data and the audio data recorded on the hard disk drive 22. In addition, the GUI control section 83 acquires the reproduced video data and audio data, and displays the monitor image.

If the user operates the operation unit 71 in a situation where the monitor image is being displayed at the time of recording/reproducing, the GUI control section 83 displays various statuses of the camera-integrated video tape recorder 2. In addition, the GUI control section 83 causes page turning sequentially on this display in accordance with the operation on the operation unit 37.

Figure 12:
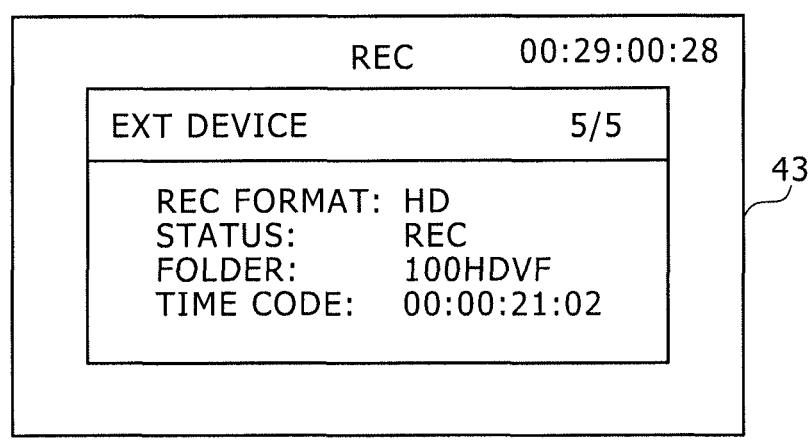
FIG. 12 is a plan view illustrating displaying of a status.

At this time, in the case where the external recording apparatus 3 is connected to the camera-integrated video tape recorder 2, the GUI control section 83 requests the external recording apparatus 3 to provide the notification of the status at regular intervals, to acquire the status of the external recording apparatus 3. In addition, as illustrated in FIG. 12, the GUI control section 83 assigns information about the acquired status to the last page that is displayed after the page turning, and thus displays the information in accordance with an operation on the operation unit 37. Note that, in the example of FIG. 12, an indication (REC) that the external recording apparatus 3 is recording, a current time code value (00:29:00:28), an indication (EXT DEVICE) that the status being displayed is that of the external recording apparatus 3, the page (5/5), and the various settings in the external recording apparatus are displayed.

(2) OPERATION OF FIRST EMBODIMENT

Figure 5:
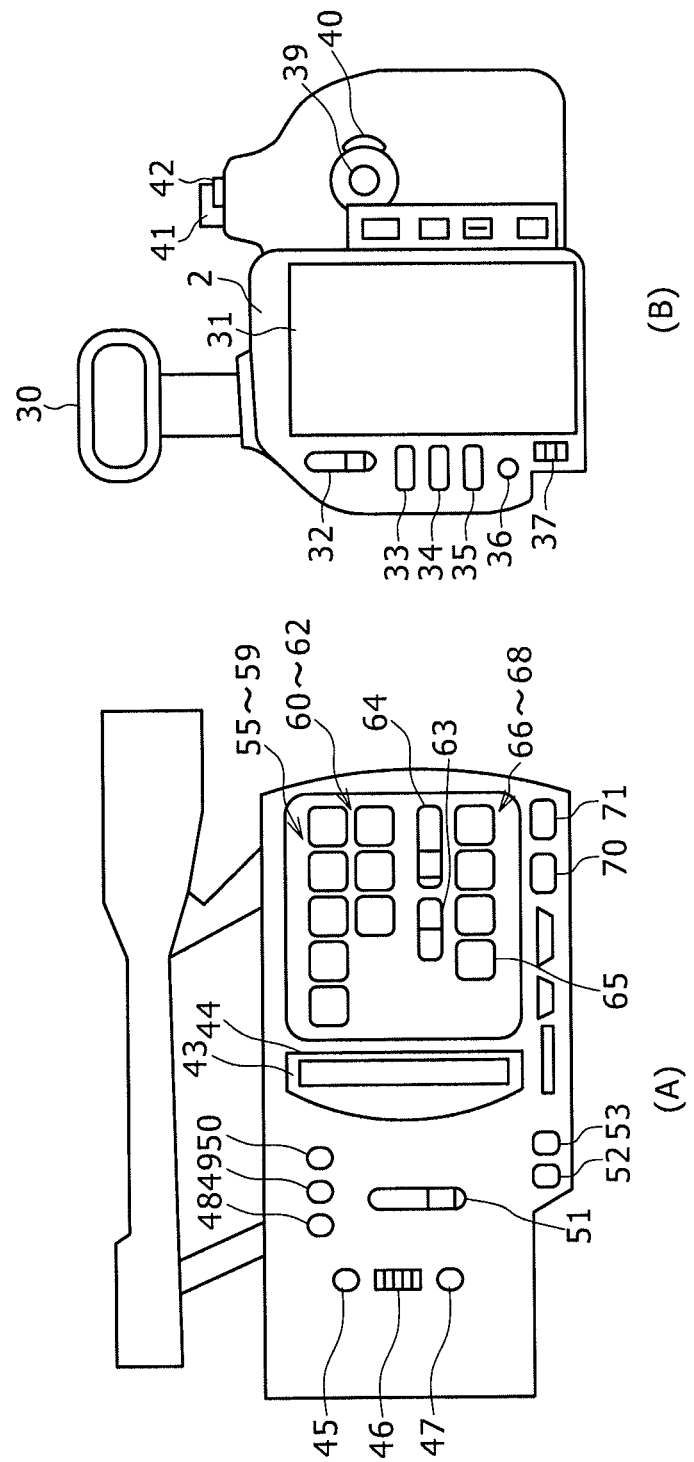
FIG. 5(A) and FIG. 5(B) are a front view and a side view of a camera-integrated video tape recorder in the recording/reproducing system of FIG. 1.

The camera-integrated video tape recorder 2, which forms a part of the recording/reproducing system 1 with the above-described structure, can be used on its own, and in that case, the imaging result obtained by the imaging device 81 is processed by the camera video control section 84 and displayed on the display section 44 and the electronic viewfinder 30 via the baseband control section 88, so that the imaging result is displayed thereon for monitoring (FIGS. 5 and 6). Moreover, in response to an operation on the operation unit 39, the video data and the audio data are outputted from the baseband control section 88 to the tape deck control section 92 and recorded on the magnetic tape.

Further, in response to an operation on the menu operation unit 36, the menu screen is displayed on the display section 44 and the electronic viewfinder 30 (FIG. 7), and if a menu on the menu screen is selected, the format of the video data and the audio data to be recorded on the magnetic tape is set, for example. In the case where they are to be recorded in HDV format, for example, the video data and the audio data outputted from the baseband control section 88 are processed by the HDV codec 89 and the encoding/decoding section 91 sequentially and recorded on the magnetic tape. Meanwhile, in the case where they are to be recorded in DV format, the video data and the audio data outputted from the baseband control section 88 are processed by the DV codec 90 and recorded on the magnetic tape.

Further, in accordance with an operation on the operation units 55 to 59 and so on in connection with reproducing processing, the imaging result recorded on the magnetic tape is reproduced by the tape deck control section 92 and processed by the encoding/decoding section 91 and the HDV codec 89 sequentially, or by the DV codec 90, and then inputted to the baseband control section 88. The imaging result inputted to the baseband control section 88 is displayed on the display section 44 and the electronic viewfinder 30, so that the user can monitor the imaging result recorded on the magnetic tape.

Still further, if the operation unit 71 for checking the status is operated in a situation where the monitor image of the imaging result is being displayed, an onscreen display of various statuses of the camera-integrated video tape recorder 2 is presented on the display section 44 and the electronic viewfinder 30, and in response to an operation on the operation unit 37, the onscreen display is subjected to the page turning to allow the user to check the remaining battery life, the various settings at the time, and so on, for example (FIG. 12).

On the other hand, the external recording apparatus 3 is connected to various types of video equipment to receive the video data and the audio data therefrom, and in response to an operation on the operation unit 8, the video data and the audio data inputted thereto sequentially are processed by the main CPU 21 and recorded on the hard disk drive 22 (FIG. 3). Further, in response to an operation on the operation unit 6, the menu screen is displayed on the display section 5, and by selecting a menu displayed on the menu screen by operating the operation units 10 to 12, the user is able to set the format at the time of recording, or the like (FIG. 4). Still further, if the operation units 10 to 12 are operated in a situation where the menu screen is not being displayed, the data recorded on the hard disk drive 22 is reproduced therefrom and outputted via the interface 23. This allows the user to monitor the video data and the audio data recorded on the hard disk drive 22, when the external recording apparatus 3 is connected to a monitor apparatus, for example. Still further, at the time of recording/reproducing, the status such as "during playback," "during recording," the remaining battery life, or the like is displayed on the display section 5.

Accordingly, it is possible to use the external recording apparatus 3 for the recording and reproducing of the video data and the audio data, by connecting it to various types of video equipment that input and output the video data and the audio data. However, the smaller the external recording apparatus 3 is, the harder the operation of the operation units will become. Thus, making various settings by operating the operation units will become more cumbersome, and the operation for the recording or reproducing will also become more cumbersome, resulting in a reduction in usability. In addition, when checking the status such as the remaining battery life, it is necessary to take the trouble to view the small display section 5 provided on the external recording apparatus 3 in order to check it, resulting in a reduction in usability. In particular, in the external recording apparatus 3, the operation units 10 to 12 are used for both the operation of selecting a menu on the menu screen and the operation of reproducing the data recorded on the hard disk drive 22, and thus they not only have poor usability but also they are likely to be operated erroneously because of the small size.

As such, in the recording/reproducing system 1 including the camera-integrated video tape recorder 2 and the external recording apparatus 3 connected thereto (FIG. 1), the camera-integrated video tape recorder 2 requests the menu list from the external recording apparatus 3, and in response thereto, the external recording apparatus 3 provides the menu list to the camera-integrated video tape recorder 2 (FIG. 8).

Further, if the user operates the operation unit 36 in the camera-integrated video tape recorder 2 to issue the instruction to display the menu screen, the menu screen is displayed on the camera-integrated video tape recorder 2, while the menu representing the external device is added as an uppermost-level item in the menu screen (FIG. 9(A)). If the menu representing the external device is selected, the menus acquired from the external recording apparatus 3 are displayed sequentially (FIGS. 9(B) and 9(C)). If any of the menus acquired from the external recording apparatus 3 is selected, the selection of this menu is notified to the external recording apparatus 3, and the process of making various settings, such as the setting of the recording format, is performed in a manner similar to that in which the process is performed when the menu screen of the external recording apparatus 3 has been operated (FIG. 10).

Therefore, in this case, various settings for the external recording apparatus can be made only by performing operations on the part of the camera-integrated video tape recorder 2 as the main apparatus, with no need to operate the external recording apparatus 3. Thus, even in the case where the external recording apparatus is designed to be small and capable of being connected to various types of video equipment and is equipped with various types of operation units, an alarm display section, and so on, it is possible to effectively avoid a reduction in usability of the external recording apparatus when it is connected to a main unit.

In particular, in the camera-integrated video tape recorder 2, the menu screen is displayed while the menus acquired from the external recording apparatus 3 are added to the menus displayed on the camera-integrated video tape recorder 2. Therefore, the user is able to make various settings for the external recording apparatus 3 at the same time when making settings for the camera-integrated video tape recorder 2, with a unified and the same operation as when the user makes various settings for the camera-integrated video tape recorder 2. Accordingly, when they are viewed as the recording/reproducing system 1, the user is able to make various settings for the external recording apparatus 3 without distinguishing between the main apparatus and the external recording apparatus. Thus, an improvement in usability is achieved.

Still further, if the imaging result is to be recorded in HDTV format in accordance with the settings in the menu screen in the camera-integrated video tape recorder 2 in a situation where the external recording apparatus 3 is connected to the camera-integrated video tape recorder 2 and the imaging result is being displayed on the display section 44 and the electronic viewfinder 30, a bit stream composed of the video data and the audio data outputted from the encoding/decoding section 91 is outputted to the external recording apparatus 3 via the LINK control section 94. Meanwhile, if the imaging result is to be recorded in DV format, a bit stream composed of the video data and the audio data outputted from the DV codec 90 is outputted to the external recording apparatus 3 via the LINK control section 94. Still further, if the user operates the operation unit 39 to issue the instruction to start or stop the recording of the imaging result, the instruction to start or stop the recording is notified to the external recording apparatus 3 via the LINK control section 94.

In the case where the remote control by the main apparatus is selected in the external recording apparatus 3 as a result of the operation on the operation unit 14, the bit stream composed of the video data and the audio data outputted from the camera-integrated video tape recorder 2 is recorded on the hard disk drive 22, or this recording is stopped, in accordance with the above instruction to start or stop the recording. Accordingly, in this case, it is possible to record the imaging result in accordance with the operation on the operation unit 39 in the camera-integrated video tape recorder 2, without the need to operate any operation unit in the external recording apparatus 3. This also contributes to effectively avoiding a reduction in usability of the external recording apparatus when it is connected to the main unit.

Meanwhile, if the operation units 55 to 59 in connection with the reproducing are operated in the camera-integrated video tape recorder 2 when the external recording apparatus 3 is set as the reproducing target in the menu screen (FIG. 11), the operations on the operation units 55 to 59 are notified to the external recording apparatus 3. In response to the notification of the operations on the operation units 55 to 59, the imaging result recorded on the hard disk drive 22 in the external recording apparatus 3 is reproduced therefrom and outputted to the camera-integrated video tape recorder 2 in the same manner as when the operation units 7 and 10 to 13, corresponding to the operation units 55 to 59, have been operated, and in the camera-integrated video tape recorder 2, the imaging result inputted thereto from the external recording apparatus 3 is displayed on the display section 44 and the electronic viewfinder 30. Therefore, regarding the operation for the reproducing also, it is possible to reproduce the imaging result in accordance with the operations on the operation units 55 to 59 in the camera-integrated video tape recorder 2, without the need to operate any operation unit in the external recording apparatus 3. This also contributes to effectively avoiding a reduction in usability of the external recording apparatus when it is connected to the main unit.

Still further, in the case where the external recording apparatus 3 is connected to the camera-integrated video tape recorder 2, the camera-integrated video tape recorder 2 acquires the status of the external recording apparatus 3 at regular intervals, and if the user operates the operation unit 71 to issue the instruction to display the status, the status of the external recording apparatus 3 is displayed together with the status of the camera-integrated video tape recorder 2.

Therefore, according to the recording/reproducing system 1, the user is able to check the status of the external recording apparatus 3 together with the status of the camera-integrated video tape recorder 2, without the need to take the trouble to check the status displayed on the display section 5 of the external recording apparatus 3. This also contributes to effectively avoiding a reduction in usability of the external recording apparatus when it is connected to the main unit.

(3) EFFECTS OF FIRST EMBODIMENT

According to the above-described structure, in the case where the external recording apparatus is connected to the main apparatus, the menus for the external recording apparatus are provided to the main apparatus, and the settings for the external recording apparatus are accepted with the main apparatus. Because of this, even in the case where the external recording apparatus is designed to be small and capable of being connected to various types of video equipment and is equipped with various types of operation units, the alarm display section, and so on, it is possible to effectively avoid a reduction in usability of the external recording apparatus when it is connected to the main unit.

In the above-described embodiment in particular, the main apparatus is the camera-integrated video tape recorder that records and reproduces the video data and the audio data, and therefore, it is possible to display the menu screen for the external recording apparatus on the display section that is used to display the monitor image of the video data, so as to accept various settings therewith. Thus, a further improvement in usability is achieved.

Moreover, the operations on the operation units for the recording/reproducing in the main apparatus are notified to the external recording device to control processing for the recording/reproducing in the external recording apparatus. Therefore, the reduction in usability can be avoided effectively, even in connection with the operation for the recording/reproducing.

Still further, the main apparatus acquires the status of the external recording apparatus from the external recording apparatus, and displays the acquired status on the display section of the main apparatus. Therefore, the reduction in usability can be avoided effectively, even in connection with the checking of the status.

(4) OTHER EMBODIMENTS

In the above-described embodiment, the camera-integrated video tape recorder is adopted as the main apparatus. Note, however, that the present invention is not limited to that case, but is also applicable to a wide variety of cases where the external recording apparatus is connected to various types of video equipment, other than the camera-integrated video tape recorder, that input and output the video data and the audio data.

INDUSTRIAL APPLICABILITY

The present invention is applicable to a system that includes a camera-integrated video tape recorder and an external recording apparatus connected to the camera-integrated video tape recorder, for example.

DESCRIPTION OF REFERENCE NUMERALS

1: RECORDING/REPRODUCING SYSTEM
2: CAMERA-INTEGRATED VIDEO TAPE RECORDER
3: EXTERNAL RECORDING APPARATUS
4: BATTERY
5, 44: DISPLAY SECTIONS
6 TO 15, 32 TO 42, 45 TO 71: OPERATION UNITS
21: MAIN CPU
22: HARD DISK DRIVE
23: INTERFACE
24: SUB-CPU
25, 27: MEMORIES
26: FALLING SENSOR
30: ELECTRONIC VIEWFINDER
31: BATTERY
43: DOOR
81: IMAGING DEVICE
82: CAMERA DRIVING CONTROL SECTION
83: GUI CONTROL SECTION
84: CAMERA VIDEO CONTROL SECTION
85: MICROPHONE
86: INPUT/OUTPUT CIRCUIT
87: AD/DA CIRCUIT
88: BASEBAND CONTROL SECTION
89: HDV CODEC
90: DV CODEC
91: ENCODING/DECODING SECTION
92: TAPE DECK CONTROL SECTION
93: TRANSPORT MECHANISM CONTROL SECTION
94: LINK CONTROL SECTION

The invention claimed is:

1. A recording/reproducing system comprising a main apparatus that processes video data and audio data, and an external recording apparatus connectable to said main apparatus to record and reproduce said video data and said audio data processed by said main apparatus, wherein said external recording apparatus includes a recording/reproducing section configured to record and reproduce said processed video data and said audio data, said recording/reproducing section being selectively operable for turning on and off cache recording of the processed video and audio data, such that when cache recording is turned on, the processed video and audio data is temporarily stored awaiting an instruction to start recording, an input/output section configured to input to and output from said main apparatus the processed video data and audio data recorded or reproduced by said recording/reproducing section, a recording/reproducing-use operation unit configured to issue an instruction to record or reproduce said processed video data and said audio data, a display section configured to display an external recording apparatus menu screen particular to and associated with said external recording apparatus and normally displayed on said external recording apparatus but normally not displayed at said main apparatus when said external recording apparatus and said main apparatus are not connected to each other, a menu-use operation unit configured to issue an instruction to display said menu screen, and select a menu displayed on said menu screen, and a control section configured to control operations of said recording/reproducing section and said display section, wherein said main apparatus includes an input/output section configured to input from said external recording apparatus or output to said external recording apparatus said processed video data and said audio data from said external recording apparatus, a processing section configured to process said video data and said audio data inputted or outputted by the input/output section of said main apparatus, a main apparatus display section configured to display a main apparatus menu screen particular to said main apparatus and not displayed on the display section of said external recording apparatus, a menu-use operation unit configured to issue an instruction to display said main apparatus menu screen on said main apparatus display section, and select an item displayed on said menu screen, and a control section configured to control operations of said processing section and said main apparatus display section, wherein the control section of said external recording apparatus displays said external recording apparatus menu screen on said display section of said external recording apparatus in accordance with an operation on the menu-use operation unit of said external recording apparatus, and accepts a setting for said recording/reproducing section in accordance with an instruction initiated by the selection of an item, including a cache recording item that is turned on, associated with said external recording apparatus and displayed on said external recording apparatus menu screen selected by operation of the menu-use operation unit of said external recording apparatus, and controls said recording/reproducing section in accordance with said accepted setting to record or reproduce said processed video data and audio data, wherein the control section of said main apparatus, when said external recording apparatus is not connected to said main apparatus, displays the main apparatus menu screen on said main apparatus display section in accordance with an operation on the menu-use operation unit of said main apparatus, and accepts a setting for said processing section in accordance with an item on said displayed menu screen selected by operation of the menu-use operation unit of said main apparatus, and controls said processing section with said accepted setting to process said video data and said audio data, and wherein the control section of said external recording apparatus and the control section of said main apparatus, when said external recording apparatus is connected to said main apparatus, causes the external recording apparatus menu screen particular to and associated with said external recording apparatus and normally displayed on the menu screen of said external recording apparatus to be provided to said main apparatus, and causes said provided external recording apparatus menu screen associated with and normally displayed on said external recording apparatus to be added to the main apparatus menu screen and displayed as a combined external recording apparatus menu screen and main apparatus menu screen on the menu screen of said main apparatus, and accepts a selection of a menu item associated with said external recording apparatus and displayed on the combined menu by operation of the menu-use operation unit of said main apparatus, and causes said control section of said external recording apparatus to control operations in accordance with said accepted selection of the menu item displayed on said combined menu.

2. The recording/reproducing system according to claim 1, wherein the processing section of said main apparatus is a recording/reproducing section configured to record and reproduce said video data and said audio data inputted or outputted by the input/output section of said main apparatus, wherein said main apparatus further includes an imaging section configured to output video data and audio data recorded by the recording/reproducing section of said main apparatus, and a recording/reproducing-use operation unit configured to issue an instruction to record or reproduce said video data and said audio data on or from the recording/reproducing section of said main apparatus, and wherein the control section of said main apparatus displays, on said display section, a monitor image of the video data recorded or reproduced by the recording/reproducing section of said main apparatus.

3. The recording/reproducing system according to claim 2, wherein the control section of said external recording apparatus and the control section of said main apparatus control the recording/reproducing section of said external recording apparatus, wherein said external recording apparatus is connected to said main apparatus, to record or reproduce said video data and said audio data, in accordance with an operation on the recording/reproducing-use operation unit of said main apparatus.

4. The recording/reproducing system according to claim 1, wherein the control section of said main apparatus displays a status of said main apparatus on the display section of said main apparatus, and when said external recording apparatus is connected to said main apparatus, acquires a status of said external recording apparatus from said external recording apparatus, and displays the acquired status of said external recording apparatus on the display section of said main apparatus.

5. A recording/reproducing apparatus that is connected to a main apparatus that processes video data and audio data, and which records and reproduces said video data and said audio data, the recording/reproducing apparatus comprising:

a recording/reproducing section configured to record and reproduce said video data and said audio data, said recording/reproducing section being electively operable for turning on and off cache recording of the processed video and audio data such that, when cache recording is turned on, the processed video and audio data is temporarily stored awaiting an instruction to start recording;

an input/output section configured to output to said main apparatus, the video data and the audio data reproduced by said recording/reproducing section and to input from said main apparatus the video data and the audio data for recording by said recording/reproducing section;

a recording/reproducing-use operation unit configured to issue an instruction to record or reproduce said video data and said audio data;

a display section configured to display a menu screen particular to and associated with said recording/reproducing apparatus and normally displayed on said recording/reproducing apparatus but normally not displayed at said main apparatus when said recording/reproducing apparatus and said main apparatus are not connected to each other;

a menu-use operation unit configured to issue an instruction to display said menu screen, and select an item displayed on said menu screen; and a control section configured to control operations of said recording/reproducing section and said display section, wherein said control section displays said menu screen on said display section in accordance with an operation on said menu-use operation unit, and accepts a setting for said recording/reproducing section in accordance with an instruction initiated by the selection of the item, including turning on a cache recording item, associated with said recording/reproducing apparatus and displayed on said menu screen selected by operating said menu-use operation unit, controls said recording/reproducing section with said accepted setting to record or reproduce said video data and said audio data, in accordance with an operation on said recording/reproducing-use operation unit, and when the recording/reproducing apparatus is connected to said main apparatus, provides the menu associated with said recording/reproducing apparatus and normally displayed on said menu screen to said main apparatus whereat the provided menu is displayed in combination with a menu particular to said main apparatus, and accepts a setting for said recording/reproducing section from the main apparatus determined by the selection at said main apparatus of an item of the menu associated with said recording/reproducing apparatus provided from said recording/reproducing apparatus to thereby control said recording/reproducing section.

6. A recording/reproducing apparatus that records and reproduces video data and said audio data and is capable of being connected to an external recording apparatus that records and reproduces said video data and audio data, the external recording apparatus being selectively turned on and off for a cache recording mode to temporarily store the video and audio data awaiting an instruction to start recording when cache recording is turned on, the recording/reproducing apparatus comprising:

a recording/reproducing section configured to record and reproduce said video data and said audio data;

an input/output section configured to output to said external recording apparatus, said video data and said audio data reproduced by said recording/reproducing section and to input from said external recording apparatus said video data and said audio data for recording by said recording/reproducing section;

a recording/reproducing-use operation unit configured to issue an instruction to record or reproduce said video data and said audio data;

a display section configured to display a menu screen;

a menu-use operation unit configured to issue an instruction to display said menu screen, and select an item displayed on said menu screen; and a control section configured to control operations of said recording/reproducing section and said display section, wherein said control section, when said external recording apparatus is not connected to the recording/reproducing apparatus, displays said menu screen on said display section in accordance with an operation on said menu-use operation unit, and accepts a setting for said recording/reproducing section in accordance with the item on said menu screen selected by operating said menu-use operation unit, and controls said recording/reproducing section with said accepted setting to record or reproduce said video data and said audio data, in accordance with an operation on said recording/reproducing-use operation unit, and when the external recording apparatus is connected to the recording/reproducing apparatus, acquires a menu from said external recording apparatus normally not displayed on said display section, the acquired menu being particular to and associated with said external recording apparatus for setting an operation of said external recording apparatus, wherein the control section displays the acquired menu in combination with said menu screen, accepts a selection of an item, including turning on a cache recording item, associated with said external recording apparatus and displayed on the acquired menu in accordance with the operation on said menu-use operation unit of the recording/reproducing apparatus, and sends an instructions to said external recording apparatus determined by said selected item to set the operation of said external recording apparatus in accordance with said selected item.

7. A method for controlling a recording/reproducing apparatus that is connected to a main apparatus that processes video data and audio data, and which records and reproduces said video data and said audio data, said recording/reproducing apparatus including a recording/reproducing section configured to record and reproduce said video data and said audio data, said recording/reproducing section being selectively operable for turning on and off cache recording of the processed video and audio data such that, when cache recording is turned on, the processed video and audio data is temporarily stored awaiting an instruction to start recording, an input/output section configured to input to said main apparatus, the video data and the audio data reproduced by said recording/reproducing section and to input from said main apparatus the video data and the audio data for recording by said recording/reproducing section, a recording/reproducing-use operation unit configured to issue an instruction to record or reproduce said video data and said audio data, a display section configured to display a menu screen particular to and associated with said recording/reproducing apparatus and normally displayed on said recording/reproducing apparatus but normally not displayed at said main apparatus when said recording/reproducing apparatus and said main apparatus are not connected to each other, and a menu-use operation unit configured to issue an instruction to display said menu screen, and select an item displayed on said menu screen, said controlling method comprising:

a menu screen-using setting accepting step of displaying said menu screen on said display section in accordance with an operation on said menu-use operation unit, and accepting a setting for said recording/reproducing section in accordance with an instruction initiated by the selection of the item, including a cache recording item that is turned on, associated with said recording/reproducing apparatus and displayed on said menu screen selected by operating said menu-use operation unit;

a recording/reproducing step of controlling said recording/reproducing section with said accepted setting to record or reproduce said video data and said audio data, in accordance with an operation on said recording/reproducing-use operation unit; and a main apparatus-using setting accepting step, performed when said recording/reproducing apparatus is connected to said main apparatus, of providing the menu associated with said recording/reproducing apparatus and normally displayed on said menu screen to said main apparatus whereat the provided menu is displayed in combination with a menu particular to said main apparatus, and accepting a setting for said recording/reproducing section from said main apparatus determined by the selection at said main apparatus of an item of the menu associated with said recording/reproducing apparatus provided from said recording/reproducing apparatus to thereby control said recording/reproducing section.

8. A method for controlling a recording/reproducing apparatus that records and reproduces video data and said audio data and is connectable to an external recording apparatus that records and reproduces said video data and audio data, said recording/reproducing apparatus including a recording/reproducing section configured to record and reproduce said video data and said audio data, an input/output section configured to output to said external recording apparatus, the video data and the audio data reproduced by said recording/reproducing section and to input from said external recording apparatus the video data and the audio data for recording by said recording/reproducing section, a recording/reproducing-use operation unit configured to issue an instruction to record or reproduce said video data and said audio data, a display section configured to display a menu screen, and a menu-use operation unit configured to issue an instruction to display said menu screen, and select an item displayed on said menu screen, said controlling method comprising:

a menu screen-using setting accepting step, performed when said external recording apparatus is not connected to the recording/reproducing apparatus, of displaying said menu screen on said display section in accordance with an operation on said menu-use operation unit, and accepting a setting for said recording/reproducing section in accordance with the item on said menu screen selected by operating said menu-use operation unit;

a recording/reproducing step of controlling said recording/reproducing section with said accepted setting to record or reproduce said video data and said audio data, in accordance with an operation on said recording/reproducing-use operation unit; and an external recording apparatus setting step, performed when said external recording apparatus is connected to said recording/reproducing apparatus, of acquiring a menu from said external recording apparatus normally not displayed on said display section, the acquired menu being particular to and associated with said external recording apparatus for setting an operation of said external recording apparatus, including turning on and off cache recording, displaying the acquired menu in combination with said menu screen, accepting a selection of an item, including turning on a cache recording item, associated with said external recording apparatus and displayed on the acquired menu in accordance with the operation on said menu-use operation unit, and sending an instruction to said external recording apparatus determined by said selected item to set the operation of said external recording apparatus in accordance with said selected item, including cache recording to temporarily store the video data and audio data awaiting an instruction to start recording.

* * * * *